US012506885B2

(12) United States Patent
Geese et al.

(10) Patent No.: US 12,506,885 B2
(45) Date of Patent: Dec. 23, 2025

(54) METHOD FOR GENERATING AT LEAST ONE ENCODING RULE TO ENCODE AN IMAGE CAPTURED BY AN OPTICAL SENSOR, METHOD FOR ENCODING AN IMAGE CAPTURED BY AN OPTICAL SENSOR, AND INFORMATION PROCESSING UNIT

(71) Applicant: Robert Bosch GmbH, Stuttgart (DE)

(72) Inventors: Marc Geese, Neu-Ulm (DE); Ulrich Seger, Leonberg-Warmbronn (DE); Tobias Rentschler, Pforzheim (DE); Wolfgang Sepp, Lachen (CH)

(73) Assignee: ROBERT BOSCH GMBH, Stuttgart (DE)

( * ) Notice: Subject to any disclaimer, the term of this patent is extended or adjusted under 35 U.S.C. 154(b) by 599 days.

(21) Appl. No.: 17/777,777

(22) PCT Filed: Nov. 13, 2020

(86) PCT No.: PCT/EP2020/082012
§ 371 (c)(1),
(2) Date: May 18, 2022

(87) PCT Pub. No.: WO2021/121807
PCT Pub. Date: Jun. 24, 2021

(65) Prior Publication Data
US 2022/0417539 A1 Dec. 29, 2022

(30) Foreign Application Priority Data
Dec. 17, 2019 (DE) .................... 10 2019 219 828.7

(51) Int. Cl.
*H04N 19/169* (2014.01)
*H04N 19/91* (2014.01)

(52) U.S. Cl.
CPC ......... *H04N 19/1887* (2014.11); *H04N 19/91* (2014.11)

(58) Field of Classification Search
None
See application file for complete search history.

(56) References Cited

U.S. PATENT DOCUMENTS

2007/0126611 A1  6/2007  Streater
2016/0366422 A1* 12/2016  Yin .................... H04N 19/70
(Continued)

FOREIGN PATENT DOCUMENTS

CN     1692626 A    11/2005
CN   110418133 A    11/2019
(Continued)

OTHER PUBLICATIONS

Nicholas Sidiropoulos, "Optimal Adaptive Scalar Quantization and Image Compression," Image Processing, 1998. ICIP 98. Proceedings. 1998 International Conference on Chicago, IL USA Oct. 4-7, 1998, Los Alamitos, CA, USA, IEEE Comput. Soc, US, vol. 2.4. Oct. 1998. 5 Pages. (Year: 1998).*

(Continued)

*Primary Examiner* — Kaitlin A Retallick
(74) *Attorney, Agent, or Firm* — NORTON ROSE FULBRIGHT US LLP

(57) ABSTRACT

A method for generating at least one encoding rule to encode an image captured by an optical sensor. The method includes at least one step of reading in the image captured by the optical sensor, and a step of generating a frequency distribution of an occurrence of light-signal values at different pixels in the image. The method further includes a step of assigning code words to light-signal values, using the fre- (Continued)

quency distribution, in order to generate the at least one encoding rule for encoding the image captured by the optical sensor.

15 Claims, 7 Drawing Sheets

(56) References Cited

U.S. PATENT DOCUMENTS

| | | | | |
|---|---|---|---|---|
| 2018/0097557 | A1* | 4/2018 | Taylor, Jr. | H04N 19/157 |
| 2018/0220159 | A1 | 8/2018 | Won et al. | |
| 2018/0262756 | A1* | 9/2018 | Filippov | H04N 19/82 |
| 2018/0332286 | A1* | 11/2018 | Pettersson | H04N 19/36 |

FOREIGN PATENT DOCUMENTS

| | | |
|---|---|---|
| JP | H07298258 A | 11/1995 |
| JP | 2007072987 A | 3/2007 |
| JP | 2008113439 A | 5/2008 |
| JP | 2016005103 A | 1/2016 |
| WO | 2007148425 A1 | 12/2007 |
| WO | 2016017272 A1 | 2/2016 |

OTHER PUBLICATIONS

Khalid Sayood, "9.6 Nonuniform Quantization" In "Introduction to Data Compression," Dec. 15, 2005. 11 Pages. (Year: 2005).*
Nicholas Sidiropoulos, "Optimal Adaptive Scalar Quantization and Image Compression," Image Processing, 1998. CIP 98. Proceedings. 1998 International Conference on Chicago, IL USA Oct. 4-7, 1998, Los Alamitos, CA, USA, IEEE Comput. Soc, US, vol. 2.4. Oct. 1998. 5 Pages.
Khalid Sayood, "9.6 Nonuniform Quantization" In "Introduction to Data Compression," Dec. 15, 2005. 11 Pages.
Antonio Ortega et al. "Adaptive Scalar Quantization Without Side Information," IEEE Transactions on Image Processing, IEE Service Center. Piscataway, NJ, US, vol. 6, No. 5, May 1997. 12 Pages.
International Search Report for PCT/EP2020/082012 Issued Feb. 8, 2021.
Jissen Multimedia, Ed. Comm., 1st ed., (2018), General Interest Foundation CG-ARTS, pp. 262-267, ISBN: 978-4-903474-61-8, English machine translation.
Podilchuk and Safranek: "Image and Video Compression: A Review," Int'l J. of High Speed Electronics and Systems, World Sci. Publ., 8(1), (1997), pp. 119-177.

* cited by examiner

METHOD FOR GENERATING AT LEAST ONE ENCODING RULE TO ENCODE AN IMAGE CAPTURED BY AN OPTICAL SENSOR, METHOD FOR ENCODING AN IMAGE CAPTURED BY AN OPTICAL SENSOR, AND INFORMATION PROCESSING UNIT

FIELD

The present invention relates to methods and an information processing unit for generating at least one encoding rule to encode an image captured by an optical sensor. The present invention also includes a computer program.

BACKGROUND INFORMATION

In image processing systems, there is often the problem of being able to store or process an image, which illustrates highly different regions of a surrounding area, using as little storage capacity as possible, but to reproduce as many details from the image as possible in a sufficiently accurate manner. For this reason, a very high image resolution is often used, which, however, requires an enormous amount of memory again for storing or encoding this image, even if individual regions of this image include fewer details to be reproduced. This means that a more approximate encoding method would also be sufficient.

SUMMARY

A method for generating at least one encoding rule to encode an image captured by an optical sensor, a method for encoding an image captured by an optical sensor, in addition, an information processing unit that utilizes at least one of these methods, and finally, a corresponding computer program, are provided in accordance with the present invention. Advantageous further refinements and improvements of the device disclosed herein are rendered possible by the measures disclosed herein.

According to the present invention, a method for generating at least one encoding rule to encode an image captured by an optical sensor is provided. In accordance with an example embodiment of the present invention, the method includes at least the following steps:

reading in the image captured by the optical sensor;
generating a frequency distribution of an occurrence of light signal values at different pixels in the image; and
assigning code words to light-signal values, using the frequency distribution, in order to generate the at least one encoding rule for encoding the image captured by the optical sensor.

For example, a camera or the like may be understood as an optical sensor. Image points in the image may be understood, for example, as pixels, at which a brightness or another light parameter acting at the respective position of the pixel may be measured and stored or passed on in the form of a light-signal value. A light-signal value may be understood, for example, as a brightness, a light intensity, for example, of a particular spectral range (color), polarization, expanded spectral channels, or the like. Code words may be understood as symbols or combinations of symbols, with the aid of which the light-signal values may be stored in, e.g., an ordinal system of code words. An encoding rule may be understood as an assignment rule, by which light-signal values or ranges of light-signal values are each intended to be assigned to corresponding code words (or vice versa).

The approach in accordance with the present invention is based on the realization that a highly efficient option for encoding an image or at least a segment of an image may be carried out by assigning different light-signal values to code words; a frequency distribution of the occurrence of a light-signal value over the image (or the segment of the image) being taken into consideration. This allows the image-signal values provided by the pixels or image points to be encoded; the encoding permitting further objects represented in the image or segment of the image to be taken into account as effectively as possible. In this connection, one takes advantage of the fact that the further objects also stand out due to an increased light intensity at corresponding pixels in the image and/or in the section of the image, so that by ascertaining the frequency distribution of the brightnesses or other light parameters at the individual pixels in the image, an information item is also available with regard to how many objects and/or different or distinguishable objects should be encoded in the image. In this manner, the subsequent use of the generated encoding rule allows an image to be encoded in a highly efficient manner with regard to storage; the encoding also permitting a high degree of detail in the resolution of individual objects in the image and allowing, as a function of this, the selection of a suitable format of code words to be used. In this manner, e.g., for images or segments of images, in which few objects or details may be distinguished, encoding may be carried out, using an encoding rule, which only spans a small code word space; whereas for images or segments of images, in which many objects or details may be distinguished, encoding may be carried out, using an encoding rule, which spans a larger code word space. Thus, the use of the frequency distribution of the light-signal values allows the option of using an encoding rule adapted to the respective image to be encoded, which means that the image or the segment of an image may be encoded as efficiently as possible with regard to storage.

Also favorable, is a specific example embodiment of the approach in accordance with the present invention in which in the assigning step, the code words are assigned to light-signal values in such a manner, that in a range of light-signal values having a high frequency in the image, adjacent code words are assigned light-signal values having a small difference between the light-signal values to be assigned to the code words. In addition, or as an alternative, in a range of light-signal values having a low frequency in the image, adjacent code words may be assigned light-signal values having a large difference between the light-signal values to be assigned to the code words. Such a specific embodiment of the approach put forward here provides the advantage of using code words having highly markedly distinguishable brightnesses and/or light parameters for the regions in the image, which have highly similar brightnesses and/or light parameters; and of encoding the regions in the image, which have very large differences in brightness, using code words having less markedly distinguishable light-signal values. In this connection, the ability to distinguish the code words may follow in light of the light-signal values, which are assigned to the specific code words in accordance with the encoding rule. In this manner, image contents may be encoded highly efficiently; the encoding allowing a high level of sharpness of details, particularly for regions having many different objects, and consequently permitting variation in the depth of resolution during the encoding of the image, as a function of the requirement.

A specific example embodiment of the present invention, where, in the reading-in step, an image representing a segment of an overall image captured by the optical sensor is read in, is particularly favorable. In this connection, at least one further segment of the overall image captured by the optical sensor may not be read in and used for generating the frequency distribution. Such a specific embodiment provides the advantage of being able to generate different encoding rules for individual, partial segments of the overall image, which means that an improvement of the efficiency of the encoding or storage of the overall image is rendered possible, if, for example, different encoding rules are able to be used for different segments of the overall image as a function of requirement.

In addition, a specific example embodiment of the present invention, in which in the reading-in step, a further image captured by the optical sensor is read in, in the generating step, a further frequency distribution of an occurrence of light-signal values at different, additional pixels in the further image is generated, and in the assigning step, further code words are assigned to the light-signal values, using the further frequency distribution, in order to generate a further encoding rule, is possible. For example, the further image may relate to a region of an overall image, which, when viewed radially symmetrically outwards from an optical center of the overall image, lies further outside of this center. Alternatively, in the case of subdividing the overall image into the shape of tiles, the further image may also correspond to a further tile from this overall image. Such a specific embodiment of the approach put forward here provides the advantage of generating different encoding rules for different images/partial images and, consequently, for a subsequent use, allowing a choice of, in each instance, the most favorable selection of one of a plurality of encoding rules in a respective usage scenario, so that the image may be encoded as efficiently as possible with regard to storage.

A specific example embodiment of the present invention, in which in the assigning step, further code words having a greater code word length than the code words of the encoding rule are used, is particularly favorable. In this manner, different requirements with regard to a level of detail in the encoding of object-rich images may be taken into account particularly effectively.

In addition, according to another specific example embodiment of the present invention, in the generating step, the frequency distribution for light-signal values of a predetermined spectral subrange of the optically visible light and/or of a spectral range detectable by the sensor (for example, an ultraviolet and/or NIR (near infrared) range and/or SWIR (short wave infrared) or FIR (far range infrared) range and/or a light parameter detectable by the sensor, may be generated; and/or in the assigning step, binary sequences, which have, in particular, a predetermined, equal bit length, being used as code words. In this connection, one may take advantage of the fact that in certain spectral subranges of the optically visible light, which constitute, for example, a specific color, such as red, green, blue or the like, an especially large amount of information about the richness of detail of the image is present, which may then be used to determine the code words and/or encoding rules, as well. The use of binary sequences as code words, in particular, code words of equal length, in an encoding rule, provides the advantage of a numerical or circuit-engineering simplification of the use of this encoding rule for encoding the image.

Also possible, is a specific example embodiment of the present invention, in which in the assigning step, a code word of a lowest value is assigned a light-signal value lying within a tolerance range about the lowest light-signal value from the frequency distribution. In addition, or as an alternative, in the assigning step, a code word of a highest value is assigned a light-signal value lying within a tolerance range about the highest light-signal value from the frequency distribution. Such a tolerance range may include, for example, a range of ten to twenty percent about the respective, lowest or highest light-signal value from the authority distribution. Such a specific embodiment of the approach proposed here provides the advantage of utilizing the code word space spanned by the code words and/or the correspondingly assigned light-signal values as optimally as possible.

In order to be able to use, with the aid of the frequency distribution, the settling velocities occurring at the individual pixels as favorably and efficiently as possible with regard to storage, for encoding an image, according to the approach proposed here, a method for encoding an image captured by an optical sensor is provided in accordance with the present invention. In accordance with an example embodiment of the present invention, the method includes the following steps:

reading in at least one image and an encoding rule; the encoding rule representing an assignment of a light parameter of a pixel of the image to one of a plurality of distinguishable code words; according to the encoding rule, at least one first difference of brightnesses and/or light parameters assigned between two adjacent code words, differs from a second difference of brightnesses and/or light parameters assigned between two further, adjacent code words; and assigning, in each instance, a code word to at least one of a plurality of pixels of the image, in order to encode the image.

Presently, an image sensor signal, which represents an entire image that is acquired by the sensor and is of an area surrounding the sensor, may be understood as an image. However, it is also possible for the image to be given merely by a segment of an overall image; the segment then being intended to be encoded with the aid of the encoding rule. In this connection, for example, an assignment rule, which is ascertained, using the frequency distribution, represented here, of the brightnesses and/or light parameters of individual pixels in an image, may be used as an encoding rule.

A specific example embodiment of the present invention, in which in the reading-in step, a selection of one of a plurality of encoding rules is made, is particularly favorable; in particular, the selection being made, using a frequency distribution of an occurrence of light-signal values at different pixels in the image. Such a specific embodiment provides the advantage of being able to select, in each instance, the encoding rule suitable for the image and/or a segment of the image, in order to encode the image/segment of the image efficiently with regard to storage; in the assigning step, an information item then being intended to be stored; the information item being used by the encoding rules for encoding the image/segment of the image, in order to be able to decode the image/segment of the image as rapidly and unequivocally as possible.

In addition, a specific example embodiment of the present invention, in which in the reading-in step, at least one further image differing from the image and a further encoding rule are read-in, is particularly advantageous; the encoding rule differing from the further encoding rule; and in the assigning step, in each instance, a further code word of the further encoding rule being assigned to at least one of a plurality of pixels of the further image, in order to encode the image. Such a specific embodiment provides the advantage of being able to use different encoding rules for different images and/or segments or regions of an overall image, so that in each instance, favorable encoding rules corresponding to the conditions in the images and/or segments or regions of the overall image may be used for encoding in an efficient manner with regard to storage.

In order to prevent optical fracture edges from forming between the individual segments of the overall image as much as possible during the decoding of the overall image, according to a further specific example embodiment of the present invention, in the assigning step, pixels in an edge region of the image may be assigned auxiliary values, which are ascertained, using the code words and the further code words. Alternatively, or in addition, according to this specific example embodiment, in the assigning step, further pixels in an edge region of the further image may be assigned further auxiliary values, which are ascertained, using the code words and the further code words. In this connection, in particular, during the determination of the auxiliary values and/or the further auxiliary values, an interpolation may be carried out, using at least one code word and one further code word. Such interpolation may be carried out, for example, in such a manner, that for pixels, which lie further inside the image, a greater weighting of the code words is assumed for the encoding of this image than for a weighting of code words for encoding an adjacent, further image bordering on the image.

Alternatively, or in addition, according to a further specific example embodiment, in the reading-in step, an image and a further image are read in, which overlap at least partially. In this manner, the decoding of the image and of the further image and/or of subsegments of an overall image may be carried out; optical artifacts in a decoded image and/or overall image being able to be kept at as low a level as possible or prevented completely.

Specific example embodiments of these methods may be implemented, for example, as software or hardware or as a mixture of software and hardware, in, for example, an information processing unit.

The approach put forward here also provides an information processing unit, which is configured to perform, control and/or implement, in corresponding devices, the steps of a variant of a method put forward here. The object of the present invention may also be achieved quickly and efficiently by this embodiment variant of the invention in the form of an information processing unit.

To this end, the information processing unit may include at least one processing unit for processing signals or data, at least one storage unit for storing signals or data, at least one interface to a sensor or to an actuator for reading in sensor signals from the sensor or for outputting data signals or control signals to the actuator, and/or at least one communications interface for reading in or outputting data, which are embedded in a communications protocol. The processing unit may be, for example, a signal processor, a microcontroller, or the like; the storage unit being able to be a flash memory, an EEPROM or a magnetic storage unit. The communications interface may be configured to read in or output data wirelessly and/or by wire; a communications interface, which is able to read in or output the data transmitted by wire, being able to read in these data, e.g., electrically or optically, from a corresponding data transmission line or to output them to a corresponding data transmission line.

In the case at hand, an information processing unit may be understood to be an electrical device, which processes sensor signals and outputs control and/or data signals as a function of them. The information processing unit may include an interface, which may take the form of hardware and/or software. In a hardware design, the interfaces may be, for example, part of a so-called system ASIC, which includes various functions of the information processing unit. However, it is also possible for the interfaces to be separate, integrated circuits or to be at least partially made up of discrete components. In a software design, the interfaces may be software modules that are present, for example, in a microcontroller, next to other software modules.

Additionally advantageous, is a computer program product or computer program including program code, which may be stored in a machine-readable carrier or storage medium, such as a solid state memory, a hard disk storage device or an optical storage device and is used for performing, implementing and/or controlling the steps of the method according to one of the above-described specific embodiments, in particular, when the program product or program is executed on a computer or a device.

Exemplary embodiments of the present invention are represented in the figures and explained in greater detail in the following description.

DETAILED DESCRIPTION OF EXAMPLE EMBODIMENTS

Figure 1:
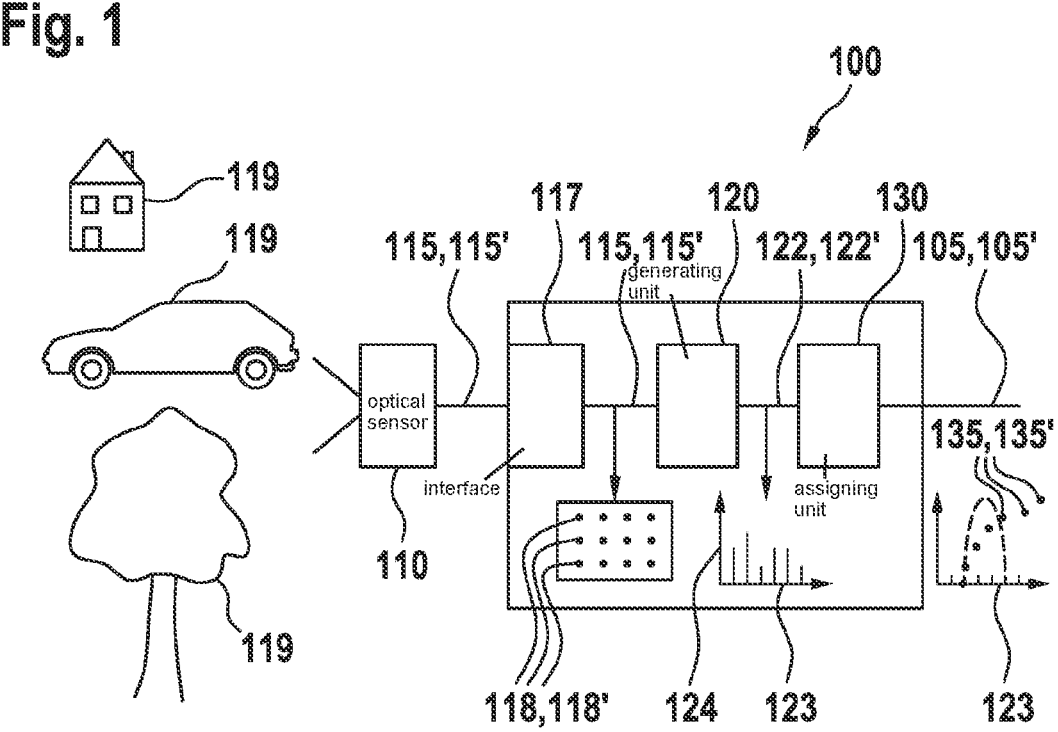
FIG. 1 shows a schematic block diagram representation of an information processing unit for generating an encoding rule to encode an image captured by an optical sensor, in accordance with an example embodiment of the present invention.

In the following description of preferred exemplary embodiments of the present invention, the same or similar reference numerals are used for the elements that are shown in the different figures and function similarly, in which case a repeated description of these elements is omitted.

FIG. 1 shows a schematic block diagram representation of an information processing unit 100 for generating an encoding rule 105 to encode an image 115 captured by an optical sensor 110. First of all, information processing unit 100 includes an interface 117 for reading in the image 115 acquired by optical sensor 110, which takes the form of a camera, for example. This acquired image 115 is represented, for example, as a two-dimensional array of a plurality of image points 118 (also called pixels), which are positioned in rows and columns, for example. Objects 119 are then represented by these pixels 118 in a surrounding area covered by optical sensor 110; these pixels 118 reproducing particular brightnesses, possibly in specific, predefined colors, as well, which the representation of the objects 119 in image 115 has at each position.

In addition, information processing unit 100 includes a generating unit 120, in which a frequency distribution 122 is generated, where a subdivision of the brightnesses or light parameters and/or light-signal values 123 occurring in pixels 118 is plotted, for example, on an abscissa of a graph for showing frequency distribution 122, versus a number 124 of the brightnesses/light-signal values 123 occurring, in each instance, in the pixels 118 of image 115, for example, on an ordinate 124 of a graph, in order to represent frequency distribution 122. Consequently, the frequency distribution 122 generated allows one to recognize, which light-signal values 123 occur in what quantity 124 over the entire region of image 115, at specific pixels 118. Through this, from frequency distribution 120, one may very easily determine, which light-signal values 123 should be graded highly finely for the detailed representation or encoding of the image, and for which light-signal values 123 more approximate gradation is sufficient without incurring an overly high loss of information, so that the objects 119 may no longer be detected with the required accuracy for, e.g., a subsequent, automated evaluation for highly autonomous driving of a vehicle.

Generating unit 120 may also be understood in such a manner, that the data content of the entirety of the light-signal values are analyzed in it, which means that generating unit 120 may also be referred to as an analyzing unit.

In addition, information processing unit 100 includes an assigning unit 130, which is configured to assign code words 135 to light-signal values 123. In this connection, code words 135 may be symbols or combinations of symbols, by which a code word space, in which light-signal values 123 may be encoded, is spanned. For example, code words 135 may be binary sequences of, for example, a 4 bit, 6 bit, 10 bit, 12 bit, 16 bit, 20 bit, or 24 bit length. In this context, in order to encode light-signal values 123 in image 115, code words 135 of equal length are advantageously used, which means that, for example, all code words 135 have a length of 4 bits. The rule of assigning code words 135 to light-signal values 123 then forms encoding rule 105. In the following, a detailed description of the procedure of assigning code words 135 to light-signal values 123 and vice versa is explained in even more depth.

In order to be able to reproduce a wide variety of scenarios of the positioning of objects 119 in the area surrounding optical sensor 110 as precisely as possible, the procedure described above may be repeated at least once more, but advantageously several times. In this connection, at least one further image 115', which differs from image 115, may be read in by optical sensor 110. This further image 115' may also be made up of a corresponding array of further pixels 118', from which a further frequency distribution 122' may be ascertained; in the further frequency distribution, further code words 135' being assigned to light-signal values 123 in accordance with a further encoding rule 105'.

In addition, the operation described above does not have to be limited to scans carried out in temporal succession, but may also be acquired from the reading-out of spatially separated sensor elements, such as in the case of split-pixel arrays or multichannel sensors or even stacked detectors (as in the case of Foveon).

It is also possible for image 115 (or further image 115') to merely be segments of an overall image, in which the arrangement of objects 119 in the surrounding area of optical sensor 110 is reproduced. In this connection, for example, image 115 and further image 115' may also be captured simultaneously, but constitute different subregions of this overall image. In this manner, appropriate encoding rule(s) 105 (and/or 105') may be generated for different subregions of the overall image, so that depending on the required detail accuracy of the image and/or encoding, a loss of information that is as small as possible may be produced by this encoding.

It is also possible for information processing unit 100 to be set up in a laboratory environment, and for only intermediately stored images 115 and/or 115' to be read in, which were recorded previously in time by an optical sensor 110, for example, during a trip in an actual environment. Therefore, it is not necessary for encoding rule 105 to be generated in real time, immediately after image 115 is generated.

Now, in order to describe the procedure in assigning code words 135 to light-signal values 123 in more detail, reference is made to a plurality of exemplary images 115 and/or segments of images 115 in the following figures; it not being important, if the image 115 used for the frequency distribution 122 to be ascertained is only a segment of an overall image or the overall image itself. Thus, for the sake of simplicity, the procedure is only described in further detail with reference to a read-in image 115, without this having to be understood as limiting in the following description.

Figure 2:
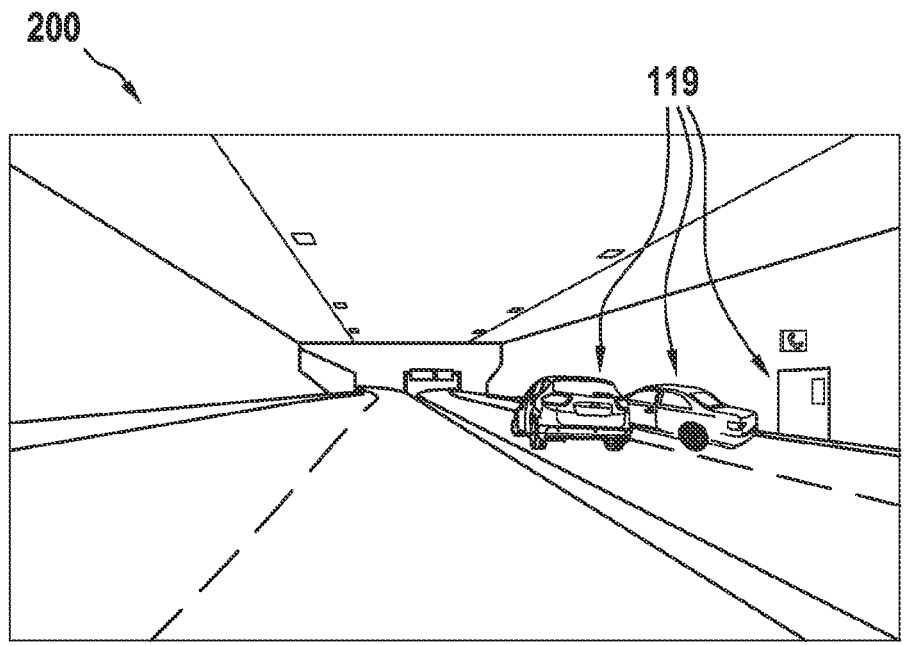
FIG. 2 shows an overall image, as is outputted, for example, as an image from a camera in the form of an optical sensor, in accordance with the representation from FIG. 1.

FIG. 2 shows an overall image 200, as is outputted, for example, as an image 115 from a camera in the form of an optical sensor 110, as shown in the representation from FIG. 1. In this connection, a plurality of objects 119, such as vehicles, doors of a tunnel wall, lights in a tunnel, road markings in a tunnel, and the tunnel portal, are apparent. If, for example, the overall image 200 represented in FIG. 2 is divided into three rows and three columns, 9 segments of this image are produced, which are each taken into consideration as an image 115 for ascertaining a separate frequency distribution 122, and which are used as a basis for determining an encoding rule 105.

In each of FIGS. 3A, 3B, 3C, and 3D, overall image 200 and, in each instance, the examined segment in the form of image 115, are represented in the partial view on the left, in order to ascertain frequency distribution 122; the graph of the frequency distribution 122 obtained from this, as well as of the correspondingly assigned code words 135 (in this case, of a length of 4 Bit, through which a code word space of 16 ordinally positioned code words is spanned), being illustrated in the partial view on the right.

Figure 3A:
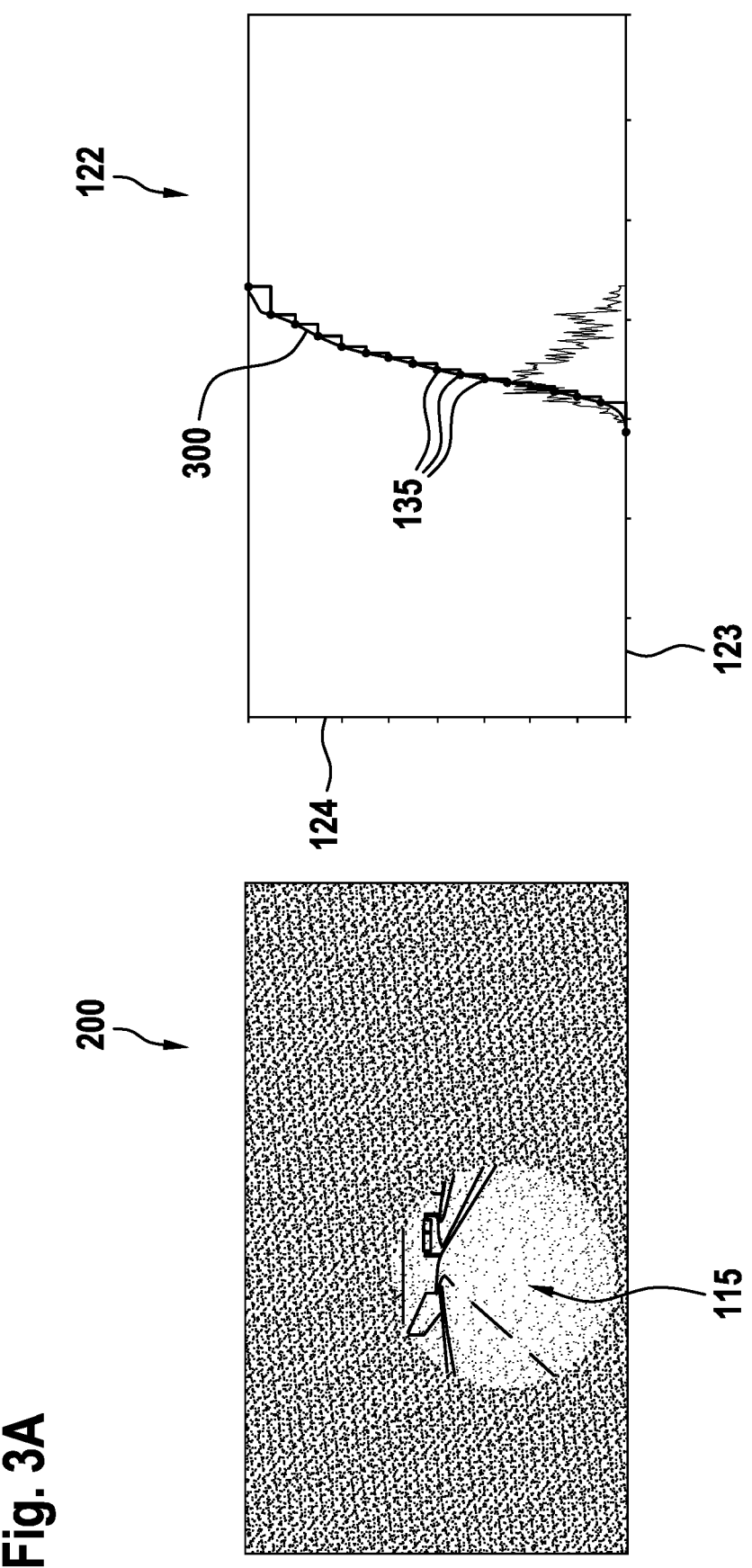
FIG. 3A through 3D in each instance, in a partial view on the left, the overall image and the different, respective, examined segments of the overall image as an image for ascertaining the frequency distribution, and in a partial view on the right, the graph of a frequency distribution obtained from this, as well as the correspondingly assigned code words.

In this connection, the image 115 in the form of a segment in the lower row of the middle column of overall image 200 is used in FIG. 3A; this segment in the form of image 115 constituting a large part of a wet and, therefore, reflective road surface in the tunnel in overall image 200. As a corresponding frequency distribution 122, a highly homogeneous range of brightnesses in the form of a light parameter is produced in a middle part of the graph in the partial view on the right; the middle part of the graph containing almost no particularly high or particularly low brightnesses as a light parameter. In other words, the light parameters, such as the brightness in this image 115, lie very close together, so that for a high resolution of details in this region, light-signal values 123 having a high frequency in image 115 are assigned to adjacent code words 135 of light signal values 123 having a small difference between the light-signal values 123 to be assigned to the code words 135. In this manner, a very steep curve of a graph 300 is produced in the right-side partial view from FIG. 3A, when code words 135 are interconnected by a connecting line in an ascending manner. In this connection, it is also apparent that in the assignment of code words 135, a code word 135 of a lowest value is assigned a light-signal value 132 situated, for example, within a tolerance range about the lowest light-signal value from the frequency distribution. A code word of a lowest value may be understood as a code word, which does not include any further, preceding code word 135 in the ordinal grouping. In addition, a code word 123 of a highest value is likewise assigned a light-signal value 123 lying (for example, within a tolerance range) about the highest light-signal value 123 from frequency distribution 122. A code word of a highest value may be understood as a code word, which does not include any further, subsequent code word 135 in the ordinal grouping. In this manner, the assignment of code words 135 allows a dynamic range of the occurrence of light-signal values 123 to be encoded highly efficiently, e.g., for a highly advantageous reconstruction in a later processing stage.

Figure 3B:
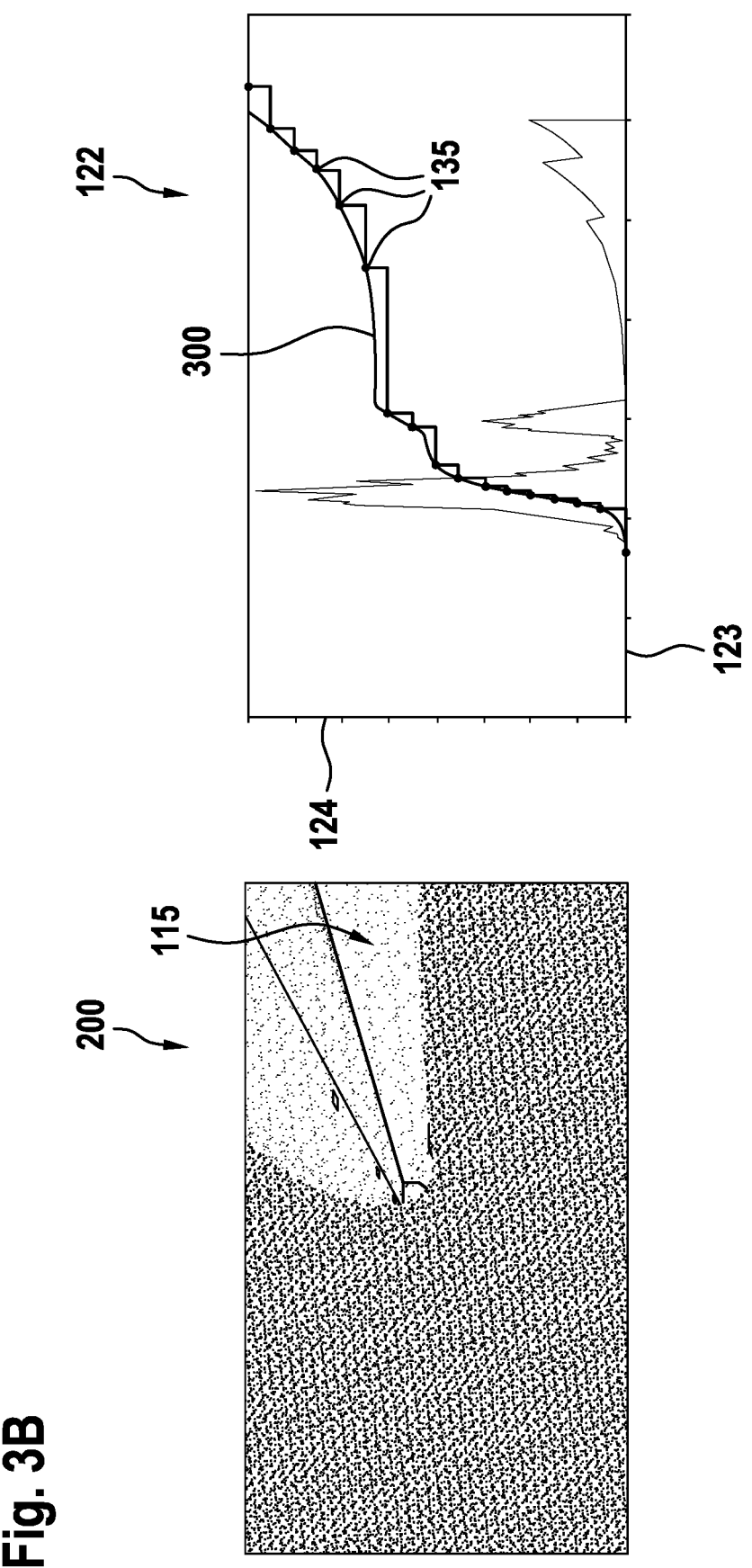

In this connection, the image 115 in the form of a segment in the upper row of the right column of overall image 200 is used in FIG. 3B; this segment in the form of image 115 representing a large part of the ceiling facing, as well as lights, over a roadway in the tunnel in overall image 200. As a corresponding frequency distribution 122, a highly inhomogeneous range of brightnesses as light parameters 123, due to the brightly shining lights present, is produced in a middle and right part of the graph in the right-side partial view from FIG. 3B; the range including, in addition to medium, also especially high brightnesses 123. In other words, some of the brightnesses as a light parameter in this image 115 lie very far apart from each other, so that for a high resolution of details in a first, middle (and also right) region of light-signal values 123 having a high frequency in image 115, adjacent code words 135 are assigned light signal values 123 having a small difference between the light-signal values 123 to be assigned to the code words 135. Lying between these two ranges of light-signal values 123, which occur in large numbers, is a further range of light-signal values 123, which are almost not found at all in image 115. Fine differentiation is also not necessary for these light-signal values 123, so that generally speaking, in a range of light-signal values 123 having a low rate of occurrence in image 115 (in comparison with other light-signal values 123), adjacent code words 135 are assigned light-signal values 123 having a large difference between the light-signal values 123 to be assigned to code words 135. In this manner, in the regions having an accumulation of the light-signal values 123, a very steep curve of a graph 300 is produced in the right-side partial view from FIG. 3B, when code words 135 are interconnected by a connecting line in an ascending manner. In the region between the two regions, at which light-signal values 123 occur in large numbers, this graph 300 then has a markedly gentler slope. In addition, it is also apparent that in the assignment of code words 135, a code word 135 of a lowest value is assigned a light-signal value 123 situated (for example, within a tolerance range) about the lowest light-signal value 123 from the frequency distribution 122. In addition, a code word 123 of a highest value is likewise assigned a light-signal value 123 lying (for example, within a tolerance range) about the highest light-signal value 123 from frequency distribution 122.

Figure 3C:
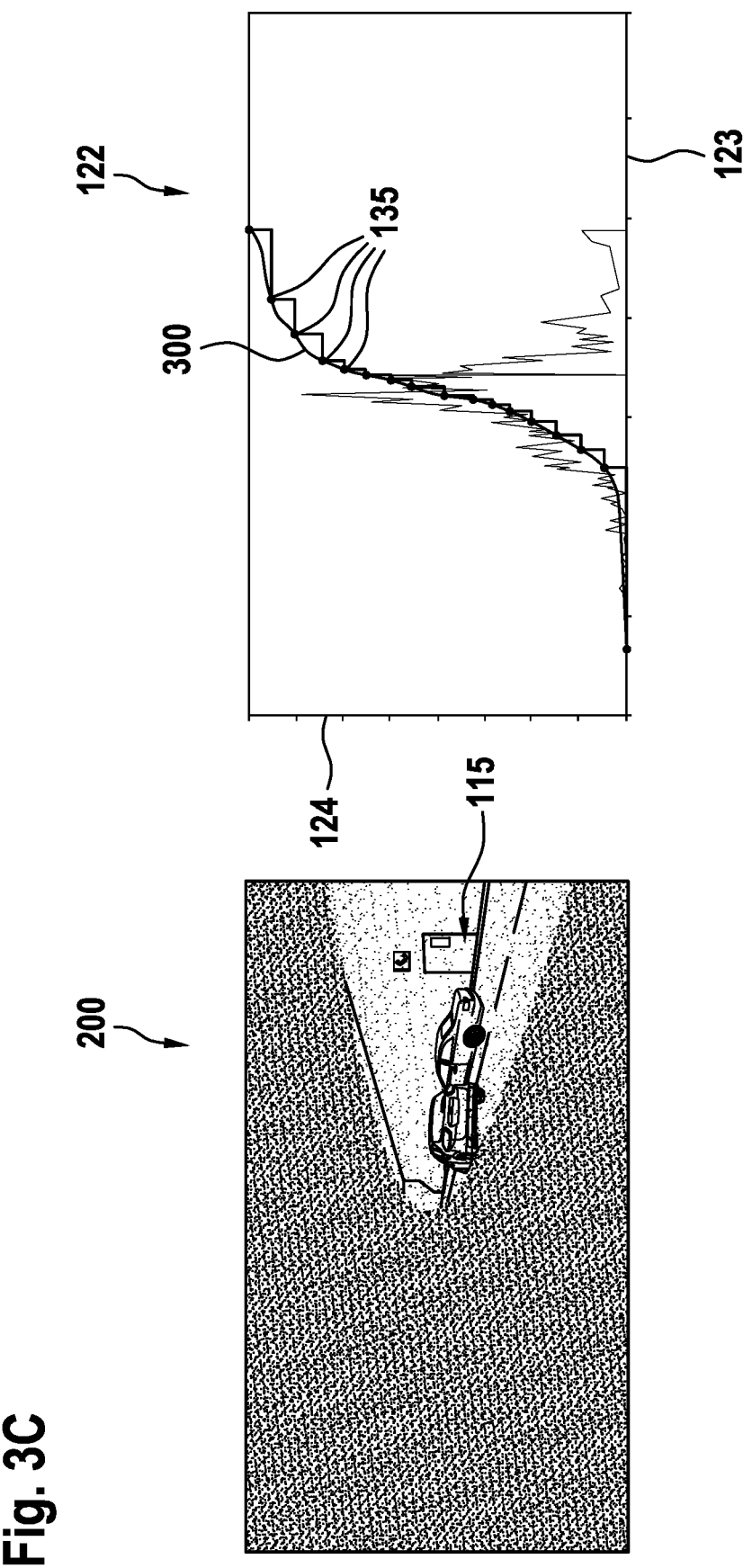

In this connection, the image 115 in the form of a segment in the middle row of the right column of overall image 200 is used in FIG. 3C; this segment in the form of image 115 depicting a plurality of vehicles and a door as objects in overall image 200. As a corresponding frequency distribution 122, due to a brightly illuminated tunnel wall, a partially inhomogeneous range of brightnesses as light parameters 123 is produced again in a middle and right part of the graph in the right-side partial view from FIG. 3C; now, this inhomogeneous region not being so strongly pronounced as in the FIG. 3B having the lights actively emitting light. Consequently, graph 300 is also not so steep as the graph from FIG. 3A, but at least steeper than the middle part of the graph 300 from FIG. 3B.

Figure 3D:
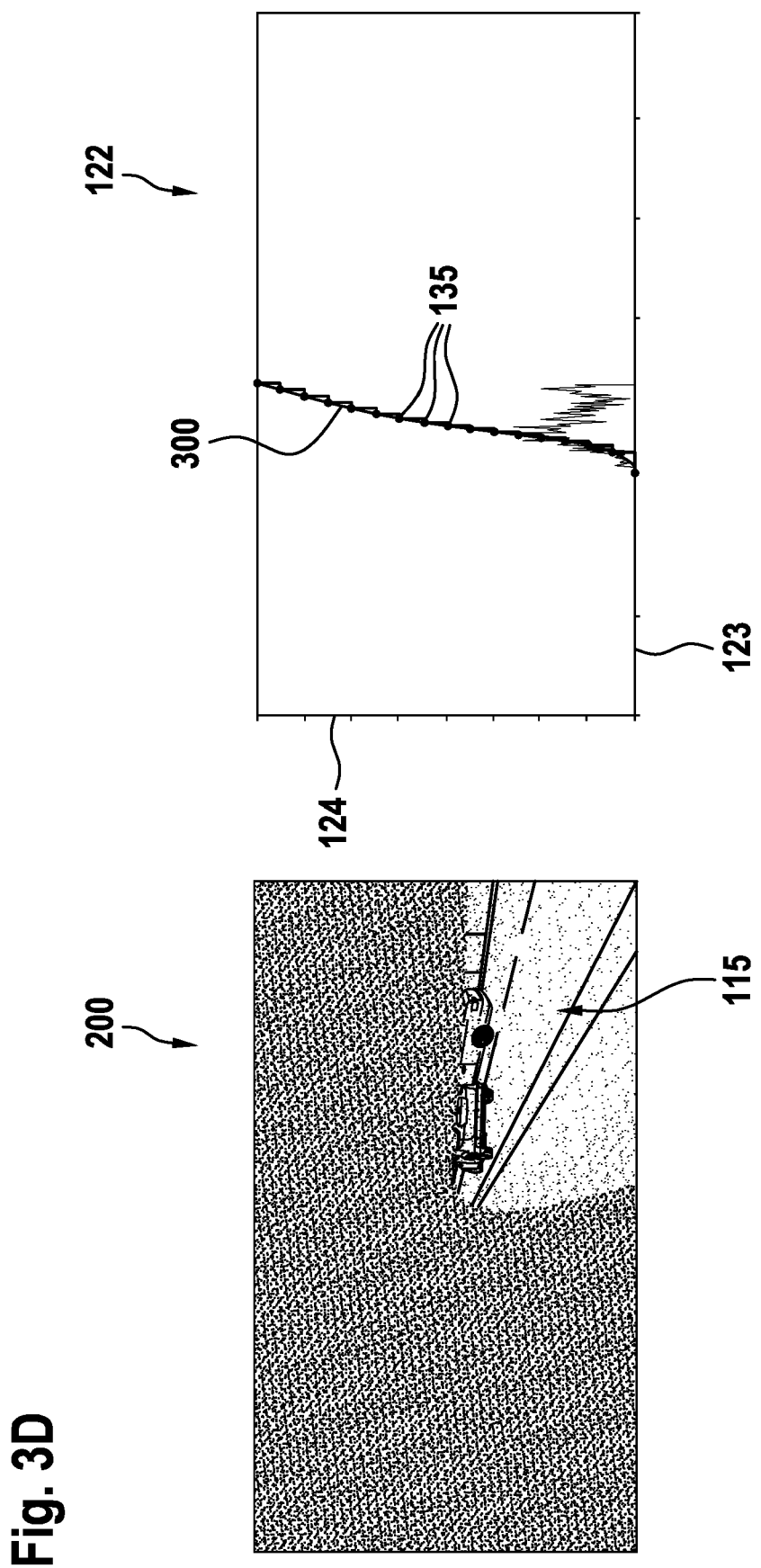

In this connection, the image 115 in the form of a segment in the lowest row of the right column of overall image 200 is used in FIG. 3D; this segment in the form of image 115 displaying a plurality of reflective road markings as objects 119 in an otherwise dark roadway in overall image 200. As a corresponding frequency distribution 122, due to the highly reflective road marking, a quite homogeneous range of brightnesses as light parameters 123 is produced again in a middle part of the graph in the right-side partial view from FIG. 3D; on the whole, this homogeneous range now being settled by lower light-signal values 123, compared with the frequencies 124 of light-signal values 123 from FIG. 3A. Consequently, graph 300 is also quite steep again, like the graph from FIG. 3A, but begins and ends, in each case, with lower light-signal values 123.

Now, in order to be able to encode an image 115 as efficiently as possible with regard to storage, the ascertained encoding rules 105 may now be used in an advantageous manner. This is described below in further detail in light of a suitable information processing unit 400 for encoding an image 115 captured by an optical sensor 110.

Figure 4:
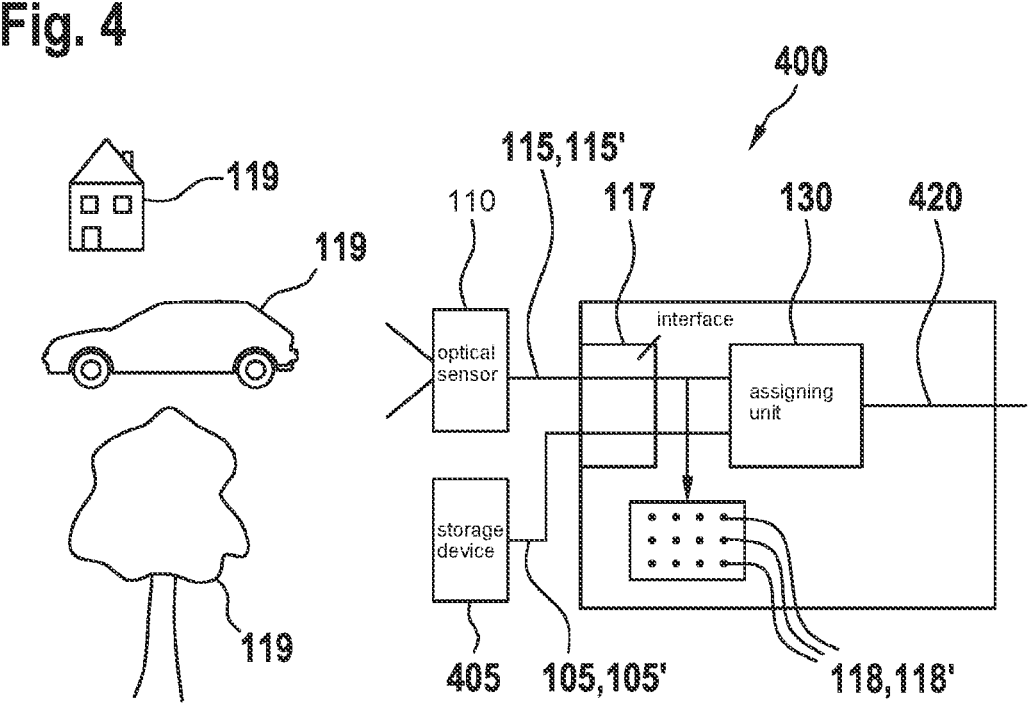
FIG. 4 shows a schematic block diagram representation of an information processing unit for encoding an image captured by an optical sensor, in accordance with an example embodiment of the present invention.

FIG. 4 shows a schematic block diagram representation of an information processing unit 400 for encoding an image 115 captured by an optical sensor 110. First of all, information processing unit 100 includes an interface 117 for reading in at least a segment of image 115 from an optical sensor 110, which, for example, takes the form of a camera again. This read-in image 115 is again represented, for example, as a two-dimensional array of a plurality of image points 118 (also called pixels), which are positioned, for example, in rows and columns. Objects 119 are then represented by these pixels 118 in a surrounding area covered by optical sensor 110; these pixels 118 reproducing particular brightnesses, possibly in specific, predefined colors, as well, which the representation of the objects 119 in image 115 has at each position.

In addition, an encoding rule 105 and, possibly, at least one further encoding rule 105' may be read in via interface 117 from, for example, a storage device 405, which is situated, in this case, outside of information processing unit 400 (but may also be positioned inside of information processing unit 400). This encoding rule 105 and/or further encoding rules 105' forms, for example, an assigning rule, as is ascertained in accordance with the description above. For example, the encoding rule may represent an assignment of a brightness and/or of a light parameter of a pixel of the segment of the image to one of a plurality of distinguishable code words; according to this encoding rule 105, at least one first difference of brightnesses in the form of light parameters 123 assigned between two adjacent code words 135, differing from a second difference of brightnesses in the form of light parameters 123 assigned between two further, adjacent code words 135. In this manner, an encoding rule 105 may be read in, which reflects a nonuniform assignment of light-signal values to code words 135, as is obtained, in particular, by taking into account a frequency distribution of the occurrence of different brightnesses in the form of light parameters in an image 115. For example, in an assigning unit 130, in each instance, a code word is then assigned to at least one of a plurality of pixels of the segment of the image, in order to encode image 115 and obtain an encoded image 420 from it. For example, in an image processing unit not shown in FIG. 4, such as, for example, of a driver assistance system of a vehicle, this encoded image 140 may then be processed further, stored, or transmitted, for example, to a central processor for further processing or transmissions of other road users.

In addition, for example, an analysis of the frequencies of the brightnesses appearing in image 115 in the form of light parameters may already take place at interface 117, as well, and a particular one of a plurality of encoding rules 105 may be selected as a function of an analysis result obtained. Such an option has the advantage of already selecting an encoding rule 105 to be used, prior to the actual encoding and/or assigning of the code words to pixels 118; the encoding rule to be used being based on a highly similar frequency distribution, which is also present in the image 115 to be currently encoded. In this manner, the loading and/or reading-in of an encoding rule 105 optimal for the encoding of the present image 115 allows the efficient encoding of image 115 with regard to storage to be accomplished highly rapidly and with a low amount of numerical or circuit-engineering expenditure.

As already explained above in the determination of encoding rules 105 and/or 105', the segments of the images 115 and/or 115' read in may also be (at least partially differing) subsegments of an overall image 200, which are captured simultaneously but illustrate different regions of overall image 200. Now, according to the representation from the partial FIGS. 3A, 3B, 3C and 3D from FIG. 3, during the encoding of image 115, individual segments (which are referred to here as image 115 and/or further image 115') of image/overall image 200 may also be encoded, using different encoding rules 105 and/or 105' (that is, encoding rule 105 and at least one further encoding rule 105'). In this manner, the different conditions and/or the different sharpness in detail necessary in different images 115 and/or 115' may be taken into account sufficiently.

If an overall image 200 according to the representation from FIG. 2 is now to be divided into a plurality of (sub)images 115 and/or 115' and encoded, then, after the decoding of an image 420 encoded in sections in such a manner, image artifacts, such as edges at the interfaces of the segments, may occur. Such image artifacts are to be prevented as much as possible, in particular, if further, automatic image processing for the detection of objects or situations is intended to be carried out, in order to be able to evaluate a scenario in front of optical sensor 100 automatically. Now, in order to prevent such image artifacts and/or edges, a further optimized form of encoding image 115 is used, as is described below in further detail.

Figure 5:
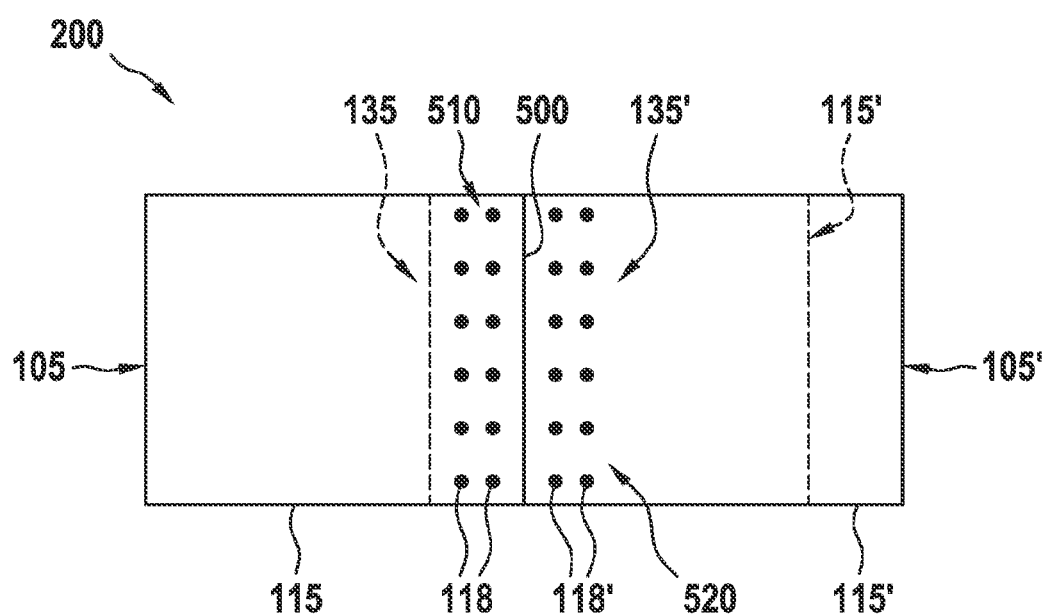
FIG. 5 shows a schematic representation of a segment and/or image, as well as a further segment and/or a further image to prepare for the encoding of the image captured by the optical sensor, in accordance with an example embodiment of the present invention.

FIG. 5 shows a schematic representation of a segment and/or image 115, as well as a further segment and/or further image 115'. In this connection, the image and the further image are situated in adjacent segments of an overall image 200, as is shown in FIG. 2. If pixels 118 of image 115 are encoded, using encoding rule 105, and further pixels 118' of further image 115' are encoded, using further encoding rule 105', these image artifacts may appear, for example, in the boundary region 500, at which image 115 borders on further image 115'. In order to prevent this, for example, pixels 118 of image 115 may obtain auxiliary values 510, which are ascertained, using the code words 135 of encoding rule 105 assigned to respective pixels 118, as well as further code words 135, which are assigned to the further pixels 180' of further image 115' in accordance with further encoding rules 105'. For example, auxiliary values 510 may be ascertained, using an interpretation, in which the weighting of further code words 135' increases, the closer the pixel 118 lies to boundary 500. In the same way, further auxiliary values 520 assigned to further pixels 118' of further image 115' may be ascertained, for example, using an interpretation, in which the weighting of code words 135 increases, the closer the further pixel 118' lies to boundary 500. In this manner, a transition of the code words 135, 135' or auxiliary values 510, 520 assigned to pixels 118, 118', respectively, that is as smooth or continuous as possible, may be achieved, so that corresponding image artifacts may possibly be prevented.

Alternatively, or in addition, image 115 and/or further image 115' may be selected or determined in such a manner, that they overlap at least partially (as is shown by the dashed-line representation of further image 115' in FIG. 5), and, through this, for example, on one hand, a code word 135 and, on the other hand, a further code word 135' are ascertained for identical pixels 118 and/or 118'. In this case, for example, a corresponding auxiliary value 510 may be ascertained, as well, using code word 135 and further code word 135', for example, by a message.

Figure 6:
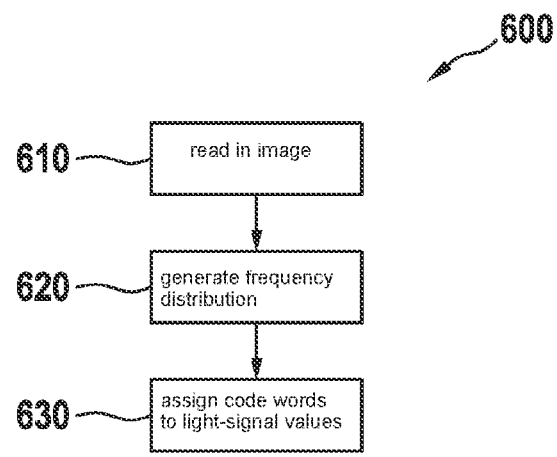
FIG. 6 shows a flow chart of an exemplary embodiment of a method for generating at least one encoding rule to encode an image captured by an optical sensor, in accordance with an example embodiment of the present invention.

FIG. 6 shows a flow chart of an exemplary embodiment of a method 600 for generating at least one encoding rule to encode an image captured by an optical sensor; the method 600 including at least one step 610 of reading in the image captured by the optical sensor. In addition, method 800 includes a step 620 of generating a frequency distribution of an occurrence of light-signal values at different pixels in the image. Finally, method 600 includes a step 630 of assigning code words to light-signal values, using the frequency distribution, in order to generate the at least one encoding rule for encoding the image captured by the optical sensor.

Figure 7:
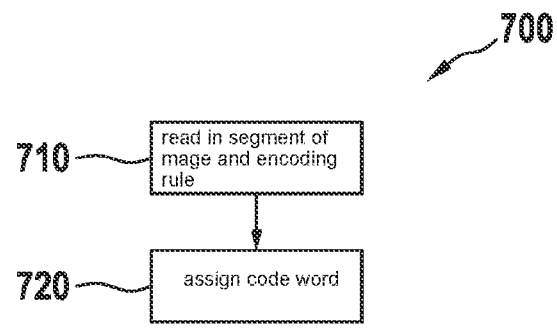
FIG. 7 shows a flow chart of an exemplary embodiment of a method for encoding an image captured by an optical sensor, in accordance with an example embodiment of the present invention.

FIG. 7 shows a flow chart of an exemplary embodiment of a method 700 for encoding an image captured by an optical sensor. Method 700 includes a step 710 of reading in at least one segment of the image and an encoding rule; the encoding rule representing an assignment of a brightness and/or a light parameter of a pixel of the segment of the image to one of a plurality of distinguishable code words; according to the encoding rule, at least one first difference of brightnesses or light parameters assigned between two adjacent code words, differing from a second difference of brightnesses or light parameters assigned between two further, adjacent code words. In addition, method 800 includes a step 720 of assigning, in each instance, a code word to at least one of a plurality of pixels of the segment of the image, in order to encode the image.

In summary, it should be noted that the approach put forward here, including the two described methods for generating at least one encoding rule to encode an image captured by an optical sensor, and for encoding an image captured by an optical sensor, provides an option of reducing the necessary data depth for transmitting, processing, and storing sensor data from optical sensors, by reducing the amount of information in a manner not without losses. In this connection, special attention may be directed, in particular, to the different aspects described below.

1.) The reduction in information is selected, so that the information losses may be adjusted locally and temporally variably.

In this connection, locally variable adjustment may be understood to mean that the information compression function may take place as a function of the "region of interest" on the 2-dimensional array covered by the sensor in the form of images 115 (for example, in the case of image sensors), and/or in a 3-dimensional volume element (in the case of 3-D sensors). For example, images or segments of images, which extend a. radially symmetrically with respect to the optical center,
b. individually on predefined tiles, e.g., top left, top middle, top right, . . . ,
c. in a relatively elongated manner with respect to a defined coordinate of the information present in the form of a grid, e.g., target coordinate x,y, where a functional application may take place in an arbitrarily defined, variable range about the target coordinates, are special shapes of such a selection of images and are particularly useful for the encoding. For practical reasons, the segments or images 115 are selected to be mostly symmetric about the target coordinate.

In addition, in this connection, temporally variable adjustment may be understood to mean that the criteria for the compression upon starting the system are not fixed, but may be varied from time to time, in order to a) react to rapidly changing situations (e.g., driving into a tunnel, etc.), for which the compression should be changed from frame to frame;
b) adjustments to slow parameter drifts (e.g., change from day to night, temperature drift, contamination, or drift due to ageing) are allowed.

2.) The reduction in information is selected in such a manner, that the effects are harmless to and/or minimally influence the following operation (that is, lie below a certain threshold). The compression is advantageously selected in such a manner, that under the given detection conditions, the hardware resources available (which may also be assigned dynamically) are utilized to a maximum extent (see Point 1.2). As an example, let it be mentioned here that this is also the case with the human visual system.

3.) the reduction of information takes place on the basis of a) statistical variables for the local surroundings, or of the overall image. In the example, these include the luminance; further parameters include the chrominance or even depth information (e.g., derived from the stereo disparity or TOF (time of flight) signals).
b) the desired target bit depth of the data.

4.) The reduction of information in different tiles is changed/adjusted by a linear crossfade function in such a manner, that no discontinuous jumps in relevant parameters (luminance, contrast, color, etc.) appear at the edges of the selected tiles, which is advantageous for preventing block artifacts;

5.) the entire processing chain is carried out in situ, for example, in the image sensor or an information processing unit embedded in it, even before the transmission to a downstream system takes place, and therefore keeps the bandwidth requirement of the system low and reduces the power demand of the overall system.

If an exemplary embodiment includes an "and/or" conjunction between a first feature and a second feature, then this is to be read such that, according to one specific embodiment, the exemplary embodiment includes both the first feature and the second feature, and according to another specific embodiment, the exemplary embodiment includes either only the first feature or only the second feature.

What is claimed is:

1. A method for generating at least one encoding rule to encode an image captured by an optical sensor, the method comprising the following steps:
   reading in the image captured by the optical sensor;
   generating a frequency distribution of an occurrence of light-signal values at different pixels in the image; and
   assigning code words to light-signal values, using the frequency distribution, to generate the at least one encoding rule for encoding the image captured by the optical sensor, wherein:
   the image has a first region and a second region,
   a number of objects or details in the first region is higher than a number of objects or details in the second region,
   a code word space for the first region is larger than a code word space for the second region,
   the code words are interconnected in a graph, and
   a slope of the graph varies depending on a frequency at which the light-signal values occur in the image, such that the slope is higher in the first region of the image than in the second region of the image when a number of the light-signal values in the frequency distribution in the first region is larger than in the frequency distribution in the second region.

2. The method as recited in claim 1, wherein in the assigning step, the code words are assigned to light-signal values in such a manner, that in a range of light-signal values having a high frequency in the image, adjacent code words are assigned light-signal values having a small difference between the light-signal values to be assigned to the code words, and/or in a range of light-signal values having a low frequency in the image, adjacent code words are assigned light-signal values having a large difference between the light-signal values to be assigned to the code words.

3. The method as recited in claim 1, wherein in the reading-in step, the image read in represents a segment of an overall image captured by the optical sensor.

4. The method as recited in claim 1, wherein in the reading-in step, a further image captured by the optical sensor is read in; in the generating step, a further frequency distribution of an occurrence of light-signal values at different, further pixels in the further image is generated; and in the assigning step, further code words are assigned to the light-signal values, using the further frequency distribution, to generate a further encoding rule.

5. The method as recited in claim 4, wherein in the assigning step, the further code words that are used have a greater code word length than the code words of the encoding rule.

6. The method as recited in claim 1, wherein in the generating step, the frequency distribution for light-signal values of a predetermined spectral subrange of optically visible light and/or of a spectral range detectable by the sensor and/or of a light parameter detectable by the sensor are generated; and/or in the assigning step, binary sequences which have a predetermined equal bit length are used as the code words.

7. The method as recited in claim 1, wherein in the assigning step, a code word of a lowest value is assigned a light-signal value lying within a tolerance range about a lowest light-signal value from the frequency distribution; and/or a code word of a highest value is assigned a light-signal value lying within a tolerance range about a highest light-signal value from the frequency distribution.

8. A method for encoding an image captured by an optical sensor, the method comprising the following steps:
reading in at least one image and an encoding rule, the encoding rule representing an assignment of a parameter of a pixel of the image to one of a plurality of distinguishable code words, wherein according to the encoding rule, at least one first difference of light-signal values assigned between two adjacent code words, differing from a second difference of light-signal values assigned between two further, adjacent code words; and
assigning, in each instance, a code word to at least one of a plurality of pixels of the image, to encode the image, wherein:
the image has a first region and a second region,
a number of objects or details in the first region is higher than a number of objects or details in the second region,
a code word space for the first region is larger than a code word space for the second region,
the code words are interconnected in a graph, and
a slope of the graph varies depending on a frequency at which the light-signal values occur in the image, such that the slope is higher in the first region of the image than in the second region of the image when a number of the light-signal values in the frequency distribution in the first region is larger than in the frequency distribution in the second region.

9. The method as recited in claim 8, wherein in the reading-in step, a selection of one of a plurality of encoding rules is made, the selection being made using a frequency distribution of an occurrence of light-signal values at different pixels in the image.

10. The method as recited in claim 8, wherein in the reading-in step, at least one further image differing from the image and a further encoding rule are read in, the encoding rule differing from the further encoding rule, and in the assigning step, in each instance, a further code word of the further encoding rule is assigned to at least one of a plurality of further pixels of the further image, to encode the further image.

11. The method as recited in claim 10, wherein in the assigning step, pixels in an edge region of a segment of the image are assigned auxiliary values which are ascertained using the code words and the further code words; and/or in the assigning step, further pixels in an edge region of the further image are assigned further auxiliary values, which are ascertained using the code words and the further code words, and wherein during the determination of the auxiliary values and/or the further auxiliary values, an interpolation is carried out, using at least one code word and one further code word.

12. The method as recited in claim 10, wherein in the reading-in step, the image and the further image read in overlap at least partially.

13. An information processing unit configured to generate at least one encoding rule to encode an image captured by an optical sensor, the information processing unit configured to:
read in the image captured by the optical sensor;
generate a frequency distribution of an occurrence of light-signal values at different pixels in the image; and
assign code words to light-signal values, using the frequency distribution, to generate the at least one encoding rule for encoding the image captured by the optical sensor, wherein:
the image has a first region and a second region,
a number of objects or details in the first region is higher than a number of objects or details in the second region,
a code word space for the first region is larger than a code word space for the second region,
the code words are interconnected in a graph, and
a slope of the graph varies depending on a frequency at which the light-signal values occur in the image, such that the slope is higher in the first region of the image than in the second region of the image when a number of the light-signal values in the frequency distribution in the first region is larger than in the frequency distribution in the second region.

14. An information processing unit configured to encode an image captured by an optical sensor, the information processing unit configured to:
read in at least one image and an encoding rule, the encoding rule representing an assignment of a parameter of a pixel of the image to one of a plurality of distinguishable code words, wherein according to the encoding rule, at least one first difference of light-signal values assigned between two adjacent code words, differing from a second difference of light-signal values assigned between two further, adjacent code words; and
assign, in each instance, a code word to at least one of a plurality of pixels of the image, to encode the image, wherein:
the image has a first region and a second region,
a number of objects or details in the first region is higher than a number of objects or details in the second region,
a code word space for the first region is larger than a code word space for the second region,
the code words are interconnected in a graph, and
a slope of the graph varies depending on a frequency at which the light-signal values occur in the image, such that the slope is higher in the first region of the image than in the second region of the image when a number of the light-signal values in the frequency distribution in the first region is larger than in the frequency distribution in the second region.

15. A non-transitory machine-readable storage medium on which is stored a computer program for generating at least one encoding rule to encode an image captured by an optical sensor, the computer program, when executed by a computer, causing the computer to perform the following steps:
reading in the image captured by the optical sensor;
generating a frequency distribution of an occurrence of light-signal values at different pixels in the image; and
assigning code words to light-signal values, using the frequency distribution, to generate the at least one encoding rule for encoding the image captured by the optical sensor, wherein:
the image has a first region and a second region,
a number of objects or details in the first region is higher than a number of objects or details in the second region,
a code word space for the first region is larger than a code word space for the second region,
the code words are interconnected in a graph, and
a slope of the graph varies depending on a frequency at which the light-signal values occur in the image, such that the slope is higher in the first region of the image than in the second region of the image when a number of the light-signal values in the frequency distribution in the first region is larger than in the frequency distribution in the second region.

* * * * *